United States Patent
Wan et al.

(10) Patent No.: US 11,883,741 B2
(45) Date of Patent: *Jan. 30, 2024

(54) INFORMATION PROCESSING METHOD AND APPARATUS, MOBILE TERMINAL, AND STORAGE MEDIUM

(71) Applicant: NETEASE (HANGZHOU) NETWORK CO., LTD., Zhejiang (CN)

(72) Inventors: Changkun Wan, Zhejiang (CN); Jianfeng Shen, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 58 days.

This patent is subject to a terminal disclaimer.

(21) Appl. No.: 17/669,422

(22) Filed: Feb. 11, 2022

(65) Prior Publication Data

US 2022/0161136 A1    May 26, 2022

Related U.S. Application Data

(63) Continuation of application No. 16/619,483, filed as application No. PCT/CN2018/113005 on Oct. 31, 2018, now Pat. No. 11,351,456.

(30) Foreign Application Priority Data

Dec. 29, 2017  (CN) .......................... 201711480328.8

(51) Int. Cl.
*A63F 13/537* (2014.01)
*G06F 3/0482* (2013.01)
*G06F 9/451* (2018.01)

(52) U.S. Cl.
CPC .......... *A63F 13/537* (2014.09); *G06F 3/0482* (2013.01); *G06F 9/451* (2018.02)

(58) Field of Classification Search
CPC ........ A63F 13/63; A63F 13/69; A63F 13/822; A63F 2300/807
See application file for complete search history.

(56) References Cited

U.S. PATENT DOCUMENTS

| 8,502,835 B1 | 8/2013 | Meehan |
| 2008/0186307 A1 | 8/2008 | Leifenberg |

FOREIGN PATENT DOCUMENTS

| CN | 1945588 A | 4/2007 |
| CN | 107240155 A | 10/2017 |

(Continued)

OTHER PUBLICATIONS

Corresponding JP search results dated Jul. 8, 2021.

(Continued)

*Primary Examiner* — Lawrence S Galka
(74) *Attorney, Agent, or Firm* — Gang Yu

(57) ABSTRACT

An information processing method and apparatus in a game, a mobile terminal, and a storage medium are provided. The method includes that: at least one virtual character is controlled to enter a continuous building mode in response to a trigger event for starting the continuous building mode; at least one model selection control is provided on a GUI, and each of the at least one model selection control corresponds to different models to be built, and at least one model selection control is configured to receive a first touch operation and determine a model to be built corresponding to the first touch operation; and when determining that at least one virtual character satisfies a preset condition, a building corresponding to the model to be built is built in at least one first building area in a game scene.

17 Claims, 7 Drawing Sheets

(56) References Cited

FOREIGN PATENT DOCUMENTS

| | | | |
|---|---|---|---|
| CN | 107308642 | A | 11/2017 |
| CN | 108245885 | A | 7/2018 |
| JP | 5906350 | B | 4/2016 |
| JP | 2017143843 | A | 8/2017 |
| WO | 2014119097 | A | 8/2014 |

OTHER PUBLICATIONS

<Fortnite> Multiplayer Escape Game Trial For Free [Must Chicken? Demolition No. 6 ? Let you experience the thrill of Must Chicken While demolition] https://www.bilibili.com/video/av14877586?from=search&seid=10109922513838037352» Sep. 28, 2017.

Yuanchao, Yang; <Design and Implementation of the Real Time Strategy Game Based on HTML5> CNKI; Mar. 25, 2014; p. 81-p. 83.

Top view

INFORMATION PROCESSING METHOD AND APPARATUS, MOBILE TERMINAL, AND STORAGE MEDIUM

CROSS-REFERENCE TO RELATED APPLICATIONS

The present disclosure is a continuation of U.S. application Ser. No. 16/619,483, which claims benefits of Chinese Patent Application No. 201711480328.8, filed to the China Patent Office on Dec. 29, 2017, the contents of which are hereby incorporated by reference in its entirety.

TECHNICAL FIELD

The present disclosure relates to the field of games, and in particular to video game with a continuous build mode for a virtual character.

BACKGROUND

Under the wave of the Internet, the continuous development and evolution of hardware and software technologies has promoted emergence of terminals and software. At the same time, a large number of mobile games with different themes emerged to meet needs of players.

For a mobile terminal running a video game, a user usually manipulates a game by thumbs of both hands. Under the restriction of hardware conditions, such as a relatively small touch screen, less manipulation dimensions and lower processor computing power, a manipulation smoothness of the mobile game cannot achieve a manipulation smoothness of a Personal Computer (PC)-side game.

It is to be noted that the information disclosed in the Background is for enhancement of understanding of the background of the present disclosure, and thus may include information that does not constitute the related art known to those of ordinary skill in the art.

SUMMARY

At least some embodiments of the present disclosure provide video game with a continuous build mode for a virtual character, so as at least to partially solve a problem in the related art that under the restriction of hardware conditions of a mobile terminal, controls of a user in a game scene through the mobile terminal during building are too cumbersome and the control smoothness is poor.

In an embodiment of the present disclosure, an information processing method is provided. This method is applied to a mobile terminal having at least one processor for executing a software application and a touch screen which is rendered with a GUI. Contents at least partially including a game scene are displayed. The game scene may include at least one virtual character. The method may include that: in response to a trigger event for starting a continuous building mode, at least one virtual character is controlled to enter the continuous building mode; at least one model selection control is provided on the GUI, and each of the at least one model selection control corresponds to different models to be built, and at least one model selection control is configured to receive a first touch operation and determine a model to be built corresponding to the first touch operation; and when determining that at least one virtual character satisfies a preset condition, a building corresponding to the model to be built is built in at least one first building area in a game scene.

In another embodiment of the present disclosure, an information processing apparatus is also provided. This apparatus is applied to a mobile terminal having at least one processor for executing a software application and a touch screen which is rendered with a GUI. Contents at least partially including a local or global game scene are displayed. The game scene may include at least one virtual character. The apparatus may include:

a response element, configured to control, in response to a trigger event for starting a continuous building mode, the at least one virtual character to enter the continuous building mode;

a control element, configured to provide at least one model selection control on the GUI, and each of the at least one model selection control corresponds to different models to be built, and the at least one model selection control is configured to receive a first touch operation and determine a model to be built corresponding to the first touch operation; and a determination element, configured to build, when determining that the at least one virtual character satisfies a preset condition, a building corresponding to the model to be built in at least one first building area in the game scene.

In another embodiment of the present disclosure, a mobile terminal is also provided. The mobile terminal may include:

a processor; and a memory, configured to store at least one executable instruction of the processor.

The processor may be configured to perform the above information processing method by executing the at least one executable instruction.

In another embodiment of the present disclosure, a computer-readable storage medium is also provided. A computer program may be executed by a processor to implement the above information processing method.

DETAILED DESCRIPTION

Figure 1:
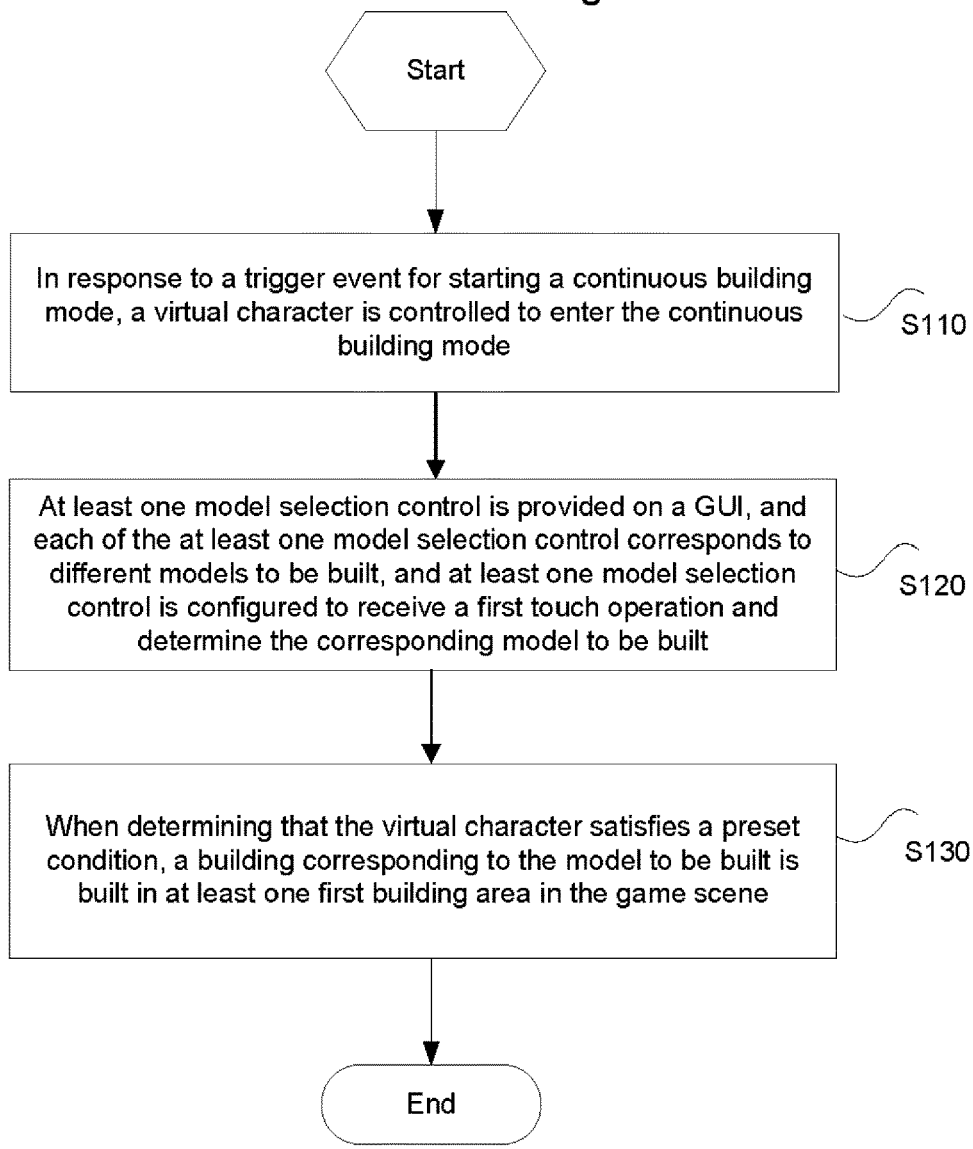
FIG. 1 is a flowchart of an information processing method according to an embodiment of the present disclosure.

It is to be noted that in the case of no conflict, features in the embodiments and embodiments in the present disclosure may be combined with each other. The present disclosure is described below with reference to the drawings and in conjunction with the embodiments in detail.

In order to make those skilled in the art better understand the solutions of the present disclosure, technical solutions in the embodiments of the present disclosure will be clearly and completely described below with reference to the drawings in the embodiments of the present disclosure. It is apparent that the described embodiments are a part of the embodiments of the present disclosure, not all of the embodiments. On the basis of the embodiments of the present disclosure, all other embodiments obtained on the premise of no creative work of those of ordinary skill in the art should fall within the scope of protection of the present disclosure.

It is to be noted that the specification and claims of the present disclosure and the terms "first", "second" and the like in the drawings are used to distinguish similar objects, and do not need to describe a specific sequence or a precedence order. It will be appreciated that data used in such a way may be exchanged under appropriate conditions, in order that the embodiments of the present disclosure described here may be implemented. In addition, terms "include" and "have" and any variations thereof are intended to cover non-exclusive inclusions. For example, it is not limited for processes, methods, systems, products or devices containing a series of steps or elements to clearly list those steps or elements, and other steps or elements which are not clearly listed or are inherent to these processes, methods, products or devices may be included instead.

It is also to be noted that various triggering events disclosed in the present specification may be preset, and different triggering events may trigger to execute different functions.

Figure 2:
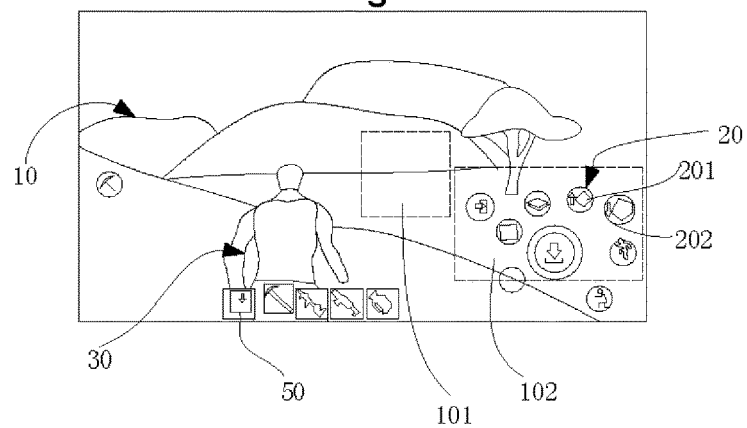
FIG. 2 is a schematic diagram of a GUI according to an exemplary embodiment of the present disclosure.
Figure 3:
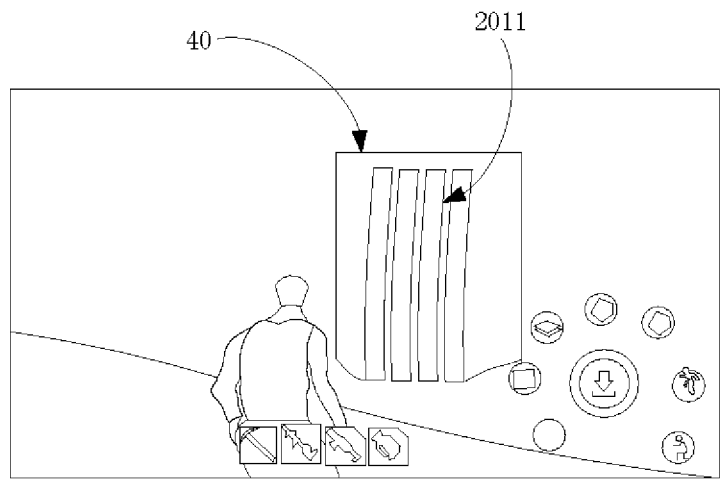
FIG. 3 is a schematic diagram of a GUI in which a first building area is in an explicit state according to an exemplary embodiment of the present disclosure.

FIG. 1 is a flowchart of an information processing method according to an embodiment of the present disclosure. An executed object of the information processing method provided by the embodiment may be any terminal device such as a computer, a tablet computer, a mobile terminal, or an electronic device. This method is applied to a mobile terminal having at least one processor for executing a software application and a touch screen which is rendered with a GUI. Contents at least partially including a local or global game scene are displayed, and the game scene includes at least one virtual character. Moreover, as shown in FIG. 2 and FIG. 3, in the present embodiment, the method includes the following steps.

At step S110, in response to a trigger event for starting a continuous building mode, a virtual character 30 is controlled to enter the continuous building mode.

At step S120, at least one model selection control 20 is provided on the GUI 10, and each of the at least one model selection control corresponds to different models 201 to be built, and at least one model selection control is configured to receive a first touch operation and determine the corresponding model 201 to be built.

At step S130, when determining that the virtual character 30 satisfies a preset condition, a building 2011 corresponding to the model 201 to be built is built in at least one first building area 40 in the game scene.

For a building function in a game, in general, a player may select a position to create a building by a two-hand interaction operation, and then complete a final rendering of an object by a trigger determination operation. When the player wants to build another object, the above interaction process is repeated. Under restriction of hardware conditions of a mobile terminal, controls of a user during a process of building in a game scene through the mobile terminal are too cumbersome, and control fluency is poor. Meanwhile, this interaction mode limits game experience of the player, and especially for complex control games, it is difficult for the player to achieve an orientation selection and building of a model to be built in a very short time.

Through the above implementation manner represented by present embodiment, when the terminal receives the touch operation input by the user for the continuous building mode, the terminal controls the virtual character 30 in the game to enter the continuous building mode, and when the terminal detects that the virtual character 30 satisfies the preset condition, the building 2011 corresponding to the model 201 to be built is built in the first building area 40. In the continuous building mode, the building 2011 is directly built without executing the touch operation for triggering the determination instruction, so that the building 2011 to be built is directly built with the selection and movement of the player.

Each step of the information processing method in the present embodiment will be further described below.

In the present exemplary embodiment, some or all of game scene elements of a game are displayed on the GUI 10 of the touch screen of the terminal, such as game pictures, character or picture effects, human-computer interaction prompts, and virtual buttons for interaction. These game scene elements are controlled to make corresponding outputs in response to at least one input touch operation input by the user for elements in these game scenes on the GUI 10 of the terminal. For example, when receiving a "shoot" instruction input by the user, the terminal controls a weapon on the GUI 10 to make an output of a "shooting action". The respective steps in the present embodiment may be performed simultaneously with each other or sequentially. The respective steps in the present embodiment may be subsequently and automatically performed after being triggered or special steps may be performed according to a user-specific input operation. The method in the game scene in the present embodiment further includes at least one virtual character 30. Each of the at least one virtual character 30 corresponds to each user who uses the terminal. The virtual character 30 is configured to perform at least one of input motions of moving, jumping, aiming, shooting, building, and attacking according to at least one received input instruction of the user.

At step S110, in response to the trigger event for starting the continuous building mode, the virtual character 30 is controlled to enter the continuous building mode. In the continuous building mode, the building 2011 corresponding to the model 201 to be built is automatically built in a game interface when a game program run by the terminal detects that at least one element of the game scene satisfies the preset condition. The at least one element may be the virtual character 30 or the like, and the preset condition may include at least one of the followings: time, position, moving speed, moving direction, orientation of the virtual character 30, and the like. The trigger event is a touch operation, such as a single click, a double click, a long press, or a slide operation, acting on a blank area or a specific area on the GUI 10. It is to be noted that an expression of the virtual character 30 entering the continuous building mode in this step may refer to that the game program currently run by the terminal enters the continuous building mode, or may refer to that a terminal system enters the continuous building mode, or may refer to that the specific virtual character 30 enters the continuous building mode.

In the present embodiment, at step S110, the operation of controlling, in response to the trigger event for starting the continuous building mode, the virtual character 30 to enter the continuous building mode includes: a continuous building mode trigger control 50 is provided on the GUI 10, the continuous building mode trigger control 50 being configured to control, in response to the touch operation, the virtual character 30 to enter the continuous building mode. The continuous building mode trigger control 50 on the GUI 10 is arranged at an edge of a display interface. In the present embodiment, the continuous building mode trigger control 50 is arranged at a lower edge of the display interface. In other embodiments, the continuous building mode trigger control 50 may be arranged at a left edge or a right edge. In other embodiments, the continuous building mode trigger control 50 may be arranged at other positions according to a custom operation of the user. The continuous building mode trigger control 50 has a significant characteristic parameter, which is used for facilitating the user to quickly locate the position of the continuous building mode trigger control 50. In the present implementation manner, the significant characteristic parameter is different from other virtual control shape parameters. In other embodiments, the significant feature parameter may be at least one of a flicker parameter and a color parameter that is different from other virtual controls.

In other embodiments, at step S110, an operation of controlling, in response to the trigger event for starting the continuous building mode, the virtual character 30 to enter the continuous building mode includes: a starting gesture for starting the continuous building mode is configured on a setting interface of the game, and when it is determined that an input operation corresponding to the starting gesture is received, the virtual character 30 is controlled to enter the continuous building mode to control the game. A receiving area 101 of the starting gesture may be a preset area or a blank area on the GUI 10. The blank area is an area, which does not include other virtual spaces, on the game interface.

In other embodiments, the virtual character 30 may be controlled to enter the continuous building mode by associating a physical button of the terminal with starting of the continuous building mode when the terminal detects that the physical button is pressed. In other embodiments, the starting of the continuous building mode is triggered by a preset audio instruction.

By the above implementation manner, the user may clearly and quickly determine the trigger control 50 of the continuous building mode to quickly control the virtual character 30 to enter the continuous building mode, thereby facilitating user operations and improving the user experience.

At step S120, at least one model selection control 20 is provided on the GUI 10. The model selection control 20 includes different models 201 to be built. The model selection control 20 is configured to receive and respond the first touch operation to determine the corresponding model 201 to be built.

In the present embodiment, the GUI 10 includes three model selection controls for receiving and responding the first touch operation to determine the corresponding model 201 to be built. And the three model selection controls 20 are arranged in a mode selection control area 102 with a preset shape 202 according to a first preset condition. In the present embodiment, the preset shape 202 is a circle. In other embodiments, the preset shape 202 may be any shape such as a square, a rectangle or a polygon. In the present embodiment, the mode selection control area 102 is arranged at the lower right of the GUI 10. In other embodiments, the mode selection control area 102 may be automatically adjusted by means of machine learning, or the mode selection control area 102 may be determined in a user-defined manner. For example, when the user is used to a left-hand operation, the user may provide the mode selection control area 102 at the lower left of the GUI 10 in a user-defined manner. In the present embodiment, the first preset condition is that circumferential arrangement is performed by taking a preset point as a circle center. For example, the circle center is a function prompt control provided on the GUI 10. The function prompt control is configured with different display patterns for indicating a weapon type currently selected by the virtual character 30, and the function prompt control is configured to respond to an operation instruction input for the control to trigger the corresponding function. When the GUI 10 receives a weapon selection instruction input by the user, the current game program of the terminal controls the function prompt control to display a corresponding weapon pattern. For example, when a display pattern of the function prompt control is "gun", and a click or long press is acted on the function prompt control, the "gun" game element in the game scene is controlled for shooting output. In other embodiments, the first preset condition is vertical arrangement at the edge of the GUI 10 or horizontal arrangement at the edge of the GUI 10.

In other embodiments, the model selection control 20 is a disk-shaped control. The disk-shaped control includes at least one touch response area. The at least one touch response area is configured to receive and respond the first touch operation to determine the corresponding model 201 to be built.

In other embodiments, the model selection control 20 may be configured with two or more models 201 to be built. After the GUI 10 receives the first touch operation acting on the model selection control 20, it is determined whether the first touch operation satisfies the preset condition to control the model selection control 20 to selectively trigger the corresponding model 201 to be built.

In the present embodiment, the first touch operation is a click operation within the range of the model selection control 20. In other embodiments, the first touch operation is an operation such as long press, double click, re-press or slide within the range of the model selection control 20.

In the present embodiment, the model 201 to be built includes a vertical wall model, a horizontal wall model, and a ladder model. In other embodiments, the model 201 to be built may also be of other building types, such as houses, stones, trees or other buildings 2011.

Through the above implementation manner, the user can quickly select the model 201 to be built within the range of convenient operation, and it is more suitable for the operating habits of the user, thereby improving the accuracy of the user operation.

At step S130, when determining that the virtual character 30 satisfies the preset condition, the building 2011 corresponding to the model 201 to be built is built in the first building area 40 in the game scene.

In the present embodiment, when a game program currently run by the terminal determines that the virtual character 30 is in the continuous building mode, the game program detects whether the virtual character 30 satisfies the preset condition in each frame of the game screen. When the virtual character 30 satisfies the preset condition, the building 2011 corresponding to the model 201 to be built is built in the first building area 40 in the game scene, and after the GUI 10 of the terminal receives a stop instruction for closing the continuous building mode, detecting whether the virtual character 30 satisfies the preset condition is stopped.

In this way, running steps of the program can be effectively reduced, the occupation and waste of storage resources of the processor are reduced, and the effect of reducing power consumption is achieved.

In other embodiments, the game program detects, at each frame, whether the virtual character is in the continuous building mode and whether the virtual character 30 satisfies the preset condition. In this way, an occurrence of a mode state detection error in the game can be effectively reduced, and the accuracy of information processing can be improved.

Figure 4:
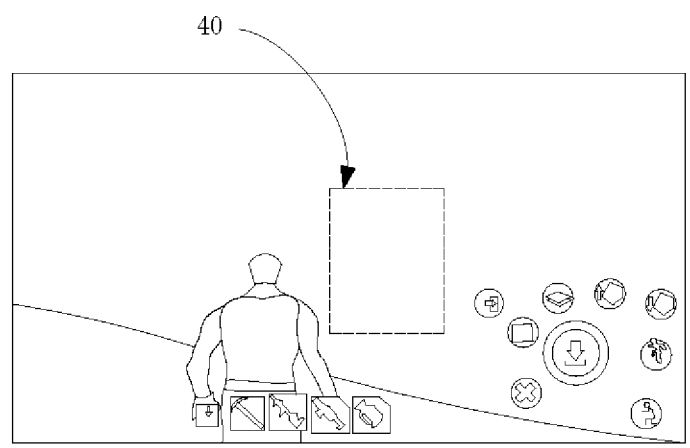
FIG. 4 is a schematic diagram of a GUI in which a first building area is in a hidden state according to an exemplary embodiment of the present disclosure.

Specifically, at step S130, through detecting position information 301 of the virtual character 30, the first building area 40 is determined according to a preset rule. A state of the first building area 40 may be set as a preview state and a hidden state. As shown in FIG. 3, when the first building area 40 is set as the preview state, the first building area 40 is controlled to be displayed in a preset color in the game scene. Through the above implementation manner, the user can be more intuitively aware of a final form of the building 2011 corresponding to the model 201 to be built, the user operation experience is improved and the occurrence of user mis-building is reduced. As shown in a dashed box in FIG. 4, when the first building area 40 is set as the hidden state, the position information 301 of the first building area 40 in the game scene is hidden in the game scene. When it is detected that the virtual character 30 satisfies the preset condition, the building 2011 corresponding to the model 201 to be built is controlled to be built in the first building area 40. Through the above implementation manner, the fidelity of the game can be improved.

Figure 5:
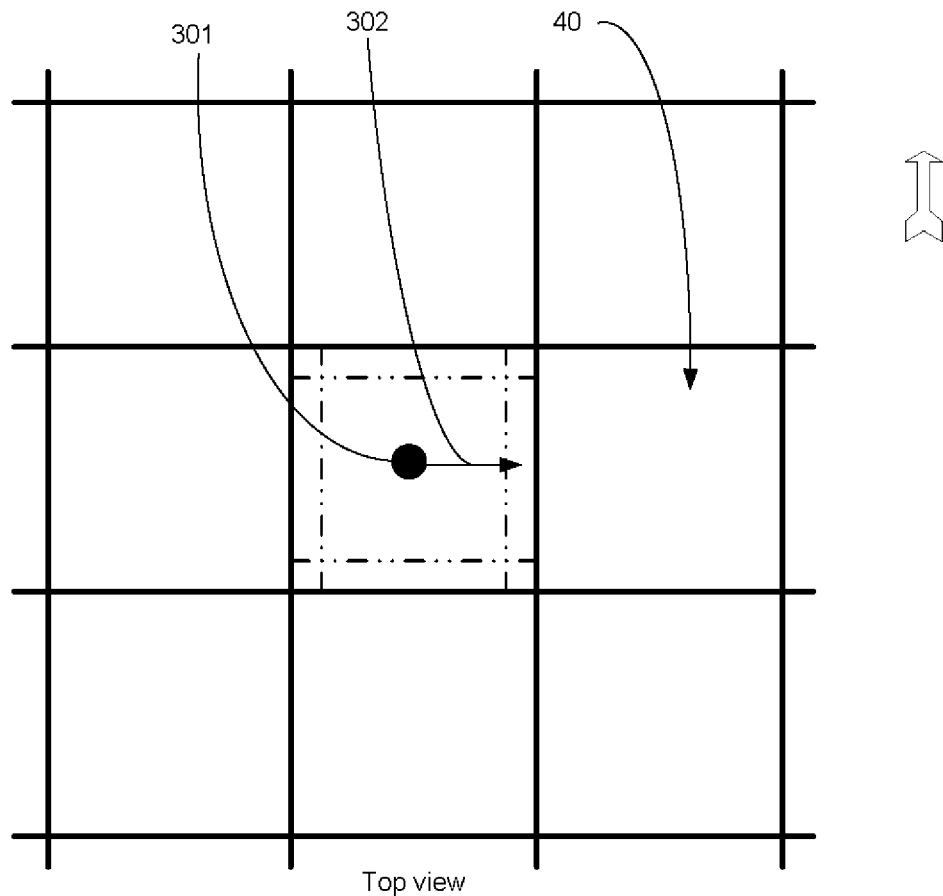
FIG. 5 is a top view of a game space composed of interconnected virtual geometries according to an exemplary embodiment of the present disclosure.

FIG. 5 is a top view of a game space composed of interconnected virtual geometries according to an exemplary embodiment of the present disclosure. In the present embodiment, at step S130, the operation of building, when determining that the virtual character 30 satisfies the preset condition, the building 2011 corresponding to the model 201 to be built in the first building area 40 in the game scene includes the following steps.

At step S1301, current position information 301 and moving state information 302 of the virtual character 30 are acquired.

At step S1303, when determining that at least one of the current position information 301 and the moving state information 302 satisfies the preset condition, the building 2011 corresponding to the model 201 to be built is built in the first building area 40 in the game scene.

Through the above implementation manner, by determining the current position information 301 and the moving state information 302 of the virtual character 30 controlled by the user satisfying the condition, the building 2011 corresponding to the model 201 to be built is built with the position and movement of the virtual character 30 controlled by the user.

Specifically, at step S1301, the current position information 301 and the moving state information 302 of the virtual character 30 are acquired.

Figure 6:
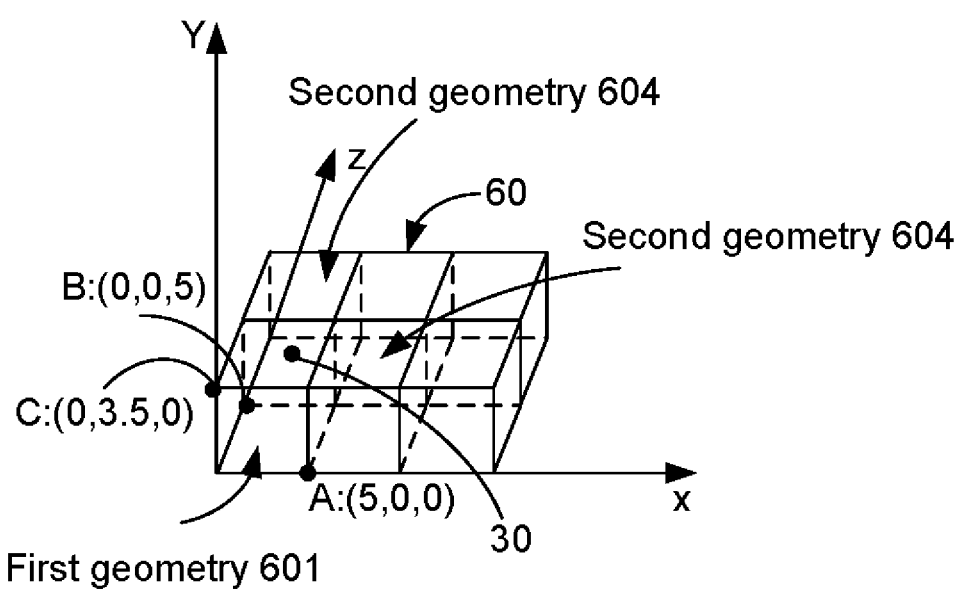
FIG. 6 is a stereogram of a game space composed of interconnected virtual geometries according to an exemplary embodiment of the present disclosure.

As shown in FIG. 6, a coordinate system XYZ is established in the game scene as a reference for the position and direction of all the game elements in the game scene. The current position information 301 of the virtual character 30 is coordinate point information of the position of the virtual character 30 in a virtual scene, and the current position information 301 of the virtual character 30 is determined by acquiring the coordinate point information of the virtual character 30. The moving state information 302 of the virtual character 30 includes orientation information, moving speed information, moving direction information, and the like of the virtual character 30. It is to be noted that the orientation information of the virtual character 30 in the game scene is different from the moving direction information. The orientation and moving direction of the virtual character 30 in the game scene are independent of each other and may be superimposed on each other. For example, the orientation of a virtual character 30A in the game scene is north, and meanwhile, the virtual character 30A is controlled to move at a preset speed V1 and move in the west direction, thereby realizing the performance effect that the virtual character 30A in the game scene takes the north direction as the current orientation, and the location change occurs in the game scene with the preset speed V1 as the moving speed and the west direction as the moving direction.

At step S1303, when determining that the at least one of the current position information 301 and the moving state information 302 satisfies the preset condition, the building 2011 corresponding to the model 201 to be built is built in the first building area 40 in the game scene.

Specifically, the game program run on the terminal acquires the at least one of the current position information 301 and the moving state information 302 of the virtual character 30, determines the first building area 40 according to the at least one of the current position information 301 and the moving state information 302, and further determines whether the at least one of the current position information 301 and the moving state information 302 satisfies the preset condition. When the at least one of the current position information 301 and the moving state information 302 satisfies the preset condition, the building 2011 is triggered to be built in the first building area 40. The above action of determining the first building area 40 and the action of triggering to build the building 2011 may be performed sequentially or simultaneously, and the game player does not feel product interruption during the operations.

In the present embodiment, at step S1303, before building the building 2011 corresponding to the model 201 to be built in the first building area 40 in the game scene, the method further includes the following steps.

At step S1302, the first building area 40 in the game scene is determined according to the at least one of the current position information 301 and the moving state information 302.

Through the above implementation manner, the program run on the terminal may predetermine the first building area 40 related to the virtual character 30 by acquiring the at least one of the current position information 301 and the moving state information 302 of the virtual character 30 controlled by the user, and automatically build the corresponding building 2011 in the predetermined first building area 40 by detecting and determining the at least one of the current position information 301 and the moving state information 302 of the virtual character 30 without triggering a determination operation instruction by the user, thus increasing the rendering and response speeds of game images.

Specifically, at step S1302, the first building area 40 in the game scene is determined according to the at least one of the current position information 301 and the moving state information 302.

As shown in FIG. 6, in the present embodiment, the manner of determining the first building area 40 in the game scene according to the at least one of the current position information 301 and the moving state information 302 includes: at least one geometry 60 is selected from multiple interconnected virtual geometries 60 as the first building area 40 according to the at least one of the position information 301 and the moving state information 302.

The space of the game scene is divided into multiple interconnected virtual geometries 60. The geometries 60 are virtual blocks defined by a coordinate system for constituting the space of the entire game scene, and each of the geometries 60 has corresponding coordinate value information. The geometry 60 may be a rectangular parallelepiped, a cube, a parallelepiped, a honeycomb, etc. It can be understood that the virtual geometries 60 may be interconnected to form the space of the entire game scene.

Figure 7:
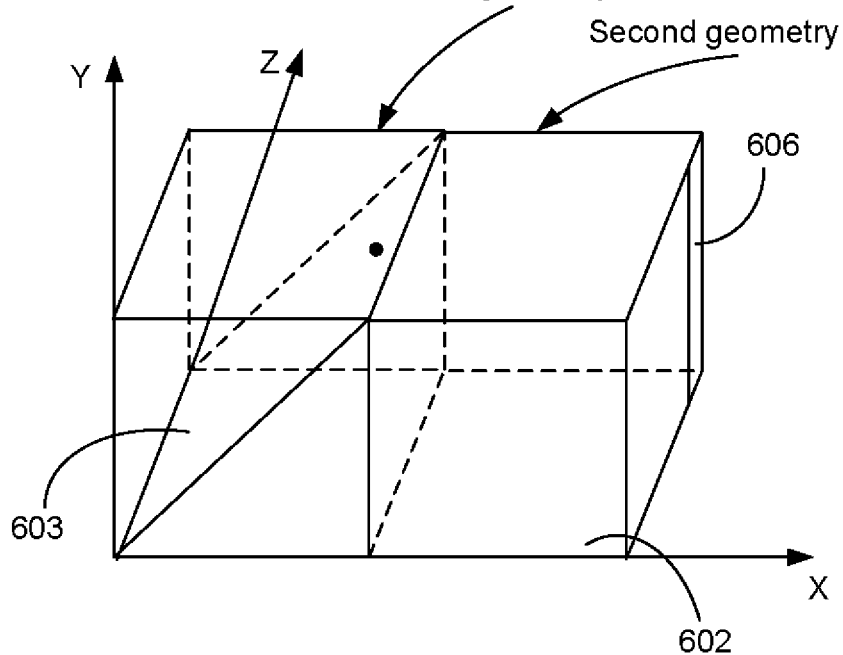
FIG. 7 is a stereogram of two adjacent geometries according to an exemplary embodiment of the present disclosure.

In the present embodiment, each geometry 60 is a rectangular parallelepiped with the same length and width. A coordinate system XYZ is established in the space of the game scene, which is horizontal XZ coordinates and a vertical upward coordinate Y, respectively. The way of spatial division refers to dividing the space into an infinite number of rectangular parallelepipeds with intervals of X=5 m, Z=5 m and vertical upward Y=3.5 m. The coordinates of a first geometry 601 on the X/Y/Z axis as shown in FIG. 7 are A: (5, 0, 0), C: (0, 3.5, 0), B: (0, 0, 5). In other embodiments, each geometry 60 may also be a rectangular parallelepiped with the same length and width, or may be a length, width and height index value set by a developer arbitrarily according to actual conditions.

Through the above implementation manners, on the one hand, the building 2011 built by the virtual character 30 and the original building in the game scene can be aligned and interconnected; and on the other hand, physical collision detection between the buildings 2011 in the game scene is avoided, so that the system overhead can be effectively reduced, and the smooth running of the game can be improved.

The following describes an example in which a space is divided into multiple mutually interconnected rectangular parallelepipeds with the same length and width. It is to be noted that multiple interconnected geometries 60 that divide the space into any shape are included in the protection scope of the present disclosure.

In the present embodiment, the first building area 40 is determined by the following steps.

At step S210, current coordinate value information of the virtual character 30 is acquired.

At step S220, the current coordinate value information of the virtual character 30 is compared with a coordinate value range of each geometry 60.

Specifically, the current coordinate value of the virtual character 30 may be either a spatial coordinate value, or a point coordinate value. In the present embodiment, the coordinate value information of the virtual character 30 is the point coordinate value, such as, a point coordinate value of the foot or a point coordinate value of the body center. Since the entire game scene is composed of at least one geometry 60, each geometry 60 has a corresponding spatial coordinate value. In addition, the position information 301 of each game element may be defined by other definitions.

At step S230, it is determined that the geometry 60 corresponding to the coordinate value range containing the current coordinate value information of the virtual character 30 is the first geometry 601 where the virtual character 30 is located, and the adjacent first preset number of geometries 60 is determined as the first building area 40 according to the first geometry 601.

It is to be noted that in a game scene space divided into multiple mutually interconnected geometries 60 having the same length and width, a surface 602 of each geometry 60 and an internal section 603 may be used as an optional area to be built. And moreover, the components of the original building in the first game scene are also pre-built according to the surface 602 of the geometry 60 and the internal section 603.

Centering on the first geometry 601, multiple second geometries 604 adjacent to the first geometry 601 are determined. And an expression of the first geometry 601 being adjacent to the second geometry 604 refers to that one surface is shared by the first geometry 601 and the second geometry 604, or one side is shared by the first geometry 601 and the second geometry 604. It is to be noted that the adjacent first building area 40 may ensure that there is at least one geometry 60 adjacent to the first geometry 601. Since the entire game space is composed of at least one geometry 60, the building 2011 corresponding to each model 201 to be built is also formed by splicing a preset number of geometries 60, so the number of the corresponding geometries 60 according to the building 2011 corresponding to the model 201 to be built is the preset number.

In other embodiments, the first building area 40 is further determined by the following steps.

At step S310, moving state information 302 of the virtual character 30 is acquired.

Specifically, the moving state information 302 includes moving speed information V and moving direction information D of the virtual character 30. A starting coordinate value of the virtual character 30 is acquired. The starting coordinate value may be periodically updated to reduce the data calculation amount of the terminal. A moving distance in the moving direction D is calculated by the moving speed information V and moving time T. A final coordinate value of the virtual character 30 is calculated by the moving distance and the starting coordinate value.

At step S320, the final coordinate value information of the virtual character 30 is compared with a coordinate value range of each geometry 60.

At step S330, it is determined that the geometry 60 corresponding to the coordinate value range containing the final coordinate value information of the virtual character 30 is the first geometry 601 where the virtual character 30 is located, and the adjacent first preset number of geometries 60 is determined as the first building area 40 according to the first geometry 601.

In the present embodiment, the content of step S320 and step S330 is similar to step S220 and step S230 in the previous embodiment, and the descriptions thereof are omitted herein.

In other embodiments, the first building area 40 is further determined by the following steps.

At step S410, the first geometry 601 where the virtual character 30 is located is determined according to the current position information 301 of the virtual character 30. The content of this step is similar to that of step S210 in the above embodiment, and the descriptions thereof are omitted herein.

At step S420, the first building area 40 adjacent to the first geometry 601 is determined according to the moving state information 302 of the virtual character 30.

Figure 8:
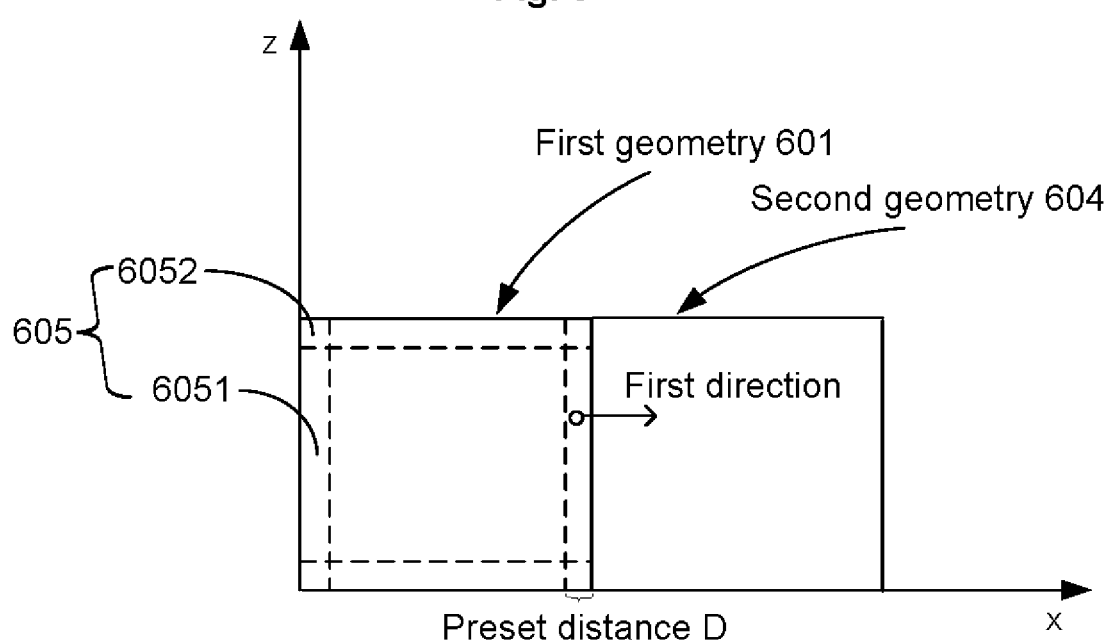
FIG. 8 is a top view of the two adjacent geometries shown in FIG. 7 according to an exemplary embodiment of the present disclosure.

In the present embodiment, as shown in FIG. 8, the moving state information 302 is orientation information of the virtual character 30. For example, when the virtual character 30 faces a first direction, the second geometry 604 adjacent to the first direction of the current geometry 60 is determined as the first building area. One surface or one internal section 603 is selected from the first geometry 601 or the second geometry 604 as the first building area 40. In an optional implementation manner, a surface 602 or an internal section 603 of the first geometry 601 or the second geometry 604 appearing in front of the current orientation of the virtual character 30 is taken as the first building area 40. In an optional implementation manner, a surface 602 or an internal section 603 of the first geometry 601 or the second geometry 604 is determined as the first building area 40 according to a type of a building model. For example, if the building model is a vertical wall, a vertical surface 602 of the first geometry 601 or the second geometry 604 is used as the first building area 40; and if the building model is an obliquely upward ladder, an inclined section 603 of the first geometry 601 or the second geometry 604 is used as the first building area 40.

Through the above implementation manners, by geometrically normalizing the game scenes, the building 2011 and the original building in the game scene can be aligned and interconnected, and the aesthetic feeling of the game images is enhanced. And moreover, physical collision detection between the buildings 2011 in the game scene is avoided, so that the system overhead can be effectively reduced, and the smooth running of the game can be improved.

In other embodiments, the moving state information 302 is moving direction information of the virtual character 30. For example, when the virtual character 30 moves in a second direction, the second geometry 604 adjacent to the first direction of the current geometry 60 is determined as the first building area.

Through the above implementation manner, the first building area 40 is determined according to the movement of the virtual character 30 controlled by the user to build the building 2011 in the first building area 40 when the preset condition is satisfied.

At step S1303, when determining that the at least one of the current position information 301 and the moving state information 302 satisfies the preset condition, the building 2011 corresponding to the model 201 to be built is built in the first building area 40.

A specific building trigger area is configured in each geometry 60. In the present embodiment, the building trigger area is configured to trigger the building of the building 2011 corresponding to the model 201 to be built. When the virtual character 30 is in the building trigger area and satisfies the preset condition, the building 2011 corresponding to the model 201 to be built is built in the first building area 40.

Also as show in FIG. 8, in the present embodiment, the building trigger area is a direction identification area configured with preset direction information. The direction identification area includes: a horizontal direction identification area 605 and a vertical direction identification area 606. Each geometry 60 includes a horizontal plane and a vertical plane. The horizontal direction identification area 605 is located on the horizontal plane of the geometry 60. The vertical direction identification area 606 is located on the vertical plane of the geometry 60.

In the present embodiment, the horizontal direction identification area 605 includes multiple unidirectional identification areas 6051 and at least one multi-directional identification area 6052. The multiple unidirectional identification areas 6051 are located at multiple edge areas in different directions on a horizontal direction of the geometry 60 respectively. And the multi-directional identification area 6052 is an overlapping area between the multiple unidirectional identification areas 6051.

The number of the unidirectional identification areas 6051 is the same as the number of the sides of the surface 602 of the geometry 60 where the unidirectional identification area 6051 is located. It is to be noted that the number of the unidirectional identification areas 6051 may also be customized as needed. In the present embodiment, the geometry 60 is a rectangular parallelepiped with a coordinate system in the game scene as a reference system. The geometry 60 includes two horizontal planes and four vertical planes. An area formed by a preset distance D inward from four edges of each horizontal plane is defined as the unidirectional identification area 6051. In the present embodiment, the preset distance is 150 cm, and the number of horizontal direction identification areas 605 is four. Each unidirectional identification area 6051 is configured with preset direction information for representing a direction represented by the unidirectional identification area 6051. For example, the four unidirectional identification areas 6051 respectively represent standard east, south, west and north of the coordinate system in the game scene. The multi-directional identification area 6052 is an area formed by overlapping at least two unidirectional identification areas 6051. The preset direction information configured in the multi-directional identification area 6052 is the same as the preset direction information in the unidirectional identification areas 6051 constituting the multi-directional identification area 6052. For example, a unidirectional identification area 6051 including "east direction information" and a unidirectional identification areas 6051 including "south direction information" constitute the multi-directional identification area 6052, and the preset direction information thereof is "east" and "south". In other embodiments, the preset direction information configured in the multi-directional identification area 6052 includes preset direction information in the unidirectional identification areas 6051 constituting the multi-directional identification area 6052 and direction information jointly constituted by the preset direction information in the unidirectional identification areas 6051 of the multi-directional identification area 6052. For example, a unidirectional identification area 6051 including "east direction information" and a unidirectional identification areas 6051 including "south direction information" constitute the multi-directional identification area 6052, and the preset direction information thereof is "east", "south" and "southeast".

The vertical direction identification area 606 includes an upper identification area 6061 and a lower identification area 6062, where the upper identification area 6061 is located in an upper edge area in a vertical direction of the geometry 60, and the lower identification area 6062 is located in a lower edge in the vertical direction of the geometry 60. The surface 602 of the geometry 60 constituting the game scene and the slope 603 of the space inside the geometry 60 may each be the first building area, and the virtual character 30 moves in the space formed by the surfaces 602 and the slopes 603 of the geometries 60.

Through the above implementation manner, by dividing the respective surfaces 602 of the geometries 60 constituting the game scene into direction identification areas, the terminal can accurately trigger the building operation of the building 2011 by determining that the virtual character 30 is in the building trigger area and satisfies the preset condition. Through this spatial division mode, the data processing magnitude of the terminal can be reduced, and the running speed of the system is optimized.

In the present embodiment, at step S13022, the operation of building, when determining that the at least one of the current position information 301 and the moving state information 302 satisfies the preset condition, the building 2011 corresponding to the model 201 to be built in the first building area 40 includes the following steps.

At step S510, a horizontal direction identification area 605 where the virtual character 30 is currently located is determined according to the current position information 301.

At step S520, when determining that the moving state information 302 of the virtual character 30 matches preset direction information corresponding to the determined horizontal direction identification area 605, the building 2011 corresponding to the model 201 to be built is built in at least one first building area 40 adjacent to the determined horizontal direction identification area 605.

Through the above implementation manner, through determining that the current position information 301 of the virtual character 30 and the current horizontal identification area satisfy the preset condition to trigger automatic building of the building 2011 in the first building area 40 adjacent to the current horizontal identification area, the purpose of directly building the building to be built by following the movement of the virtual character is achieved. The problem of operation interruption caused by the user inputting a confirmation instruction every time the building 2011 is built in the conventional art is effectively reduced.

Specifically, in step S510, the current horizontal direction identification area 605 where the virtual character 30 is located is determined according to the current position information 301 of the virtual character 30.

As shown in FIG. 6 and FIG. 8, a coordinate system is established in the game scene, and each object established in the coordinate system may be marked by the coordinate system to determine the position of each object in the coordinate system. The game scene is spatially divided into multiple virtual geometries 60 by means of coordinates. The space of the entire game scene and all or part of the game elements in the space are composed of these geometries 60. Each geometry 60 also has an independent coordinate system. The horizontal direction identification area 605 located on the surface 602 or the interior of each geometry 60 is divided by the independent coordinate system of each geometry 60. In the present embodiment, the unidirectional identification area 6051 in each horizontal direction identification area 605 is divided by the independent coordinate system. It is to be noted that the independent coordinate system and the coordinate system of the game scene may be mutually converted. That is, after acquiring an absolute coordinate point of the virtual character 30 currently in the coordinate system of the game scene, the absolute coordinate point may be converted into a relative coordinate point of each geometry 60 in the independent coordinate system.

The relative coordinate point is compared with the coordinate point range of the unidirectional identification area 6051 to determine a specific unidirectional identification area 6051 in the horizontal direction identification area 605 where the virtual character 30 is currently located.

In other embodiments, all of the horizontal direction identification areas 605 and the unidirectional identification areas and the like may also be divided by the coordinate system of the game scene.

Further, in other embodiments, in order to more accurately determine the horizontal direction identification area 605 where the virtual character 30 is currently located, the step S510 of determining the current horizontal direction identification area 605 where the virtual character 30 is located according to the current position information 301 of the virtual character 30 further includes the following steps.

At step S5101, a vertical direction identification area 606 where the virtual character 30 is currently located is determined according to the current position information 301 of the virtual character 30.

Figure 9A:
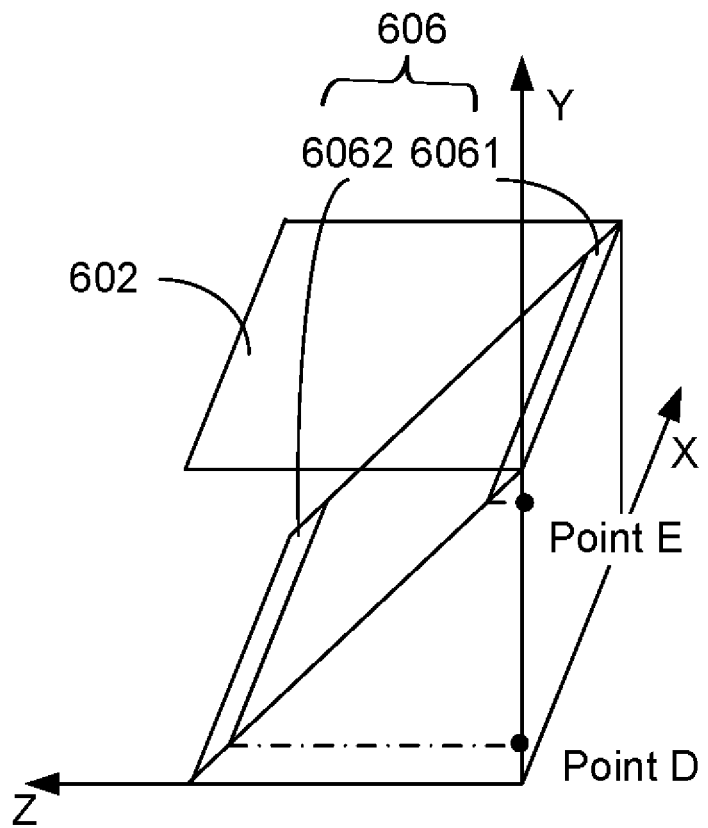
FIG. 9A is a schematic diagram of a vertical identification area of the first geometry shown in FIG. 7 according to an exemplary embodiment of the present disclosure.
Figure 9B:
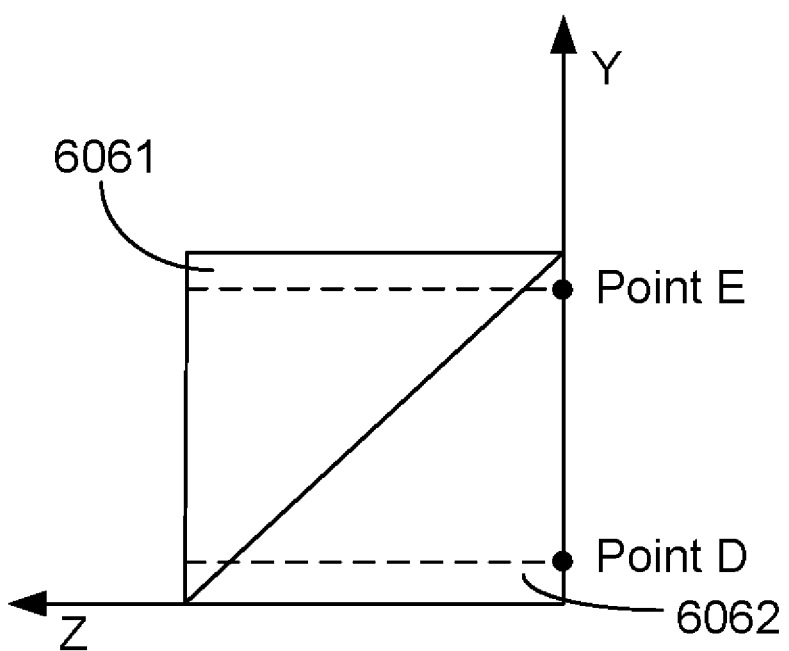
FIG. 9B is another schematic diagram of a vertical identification area of the first geometry shown in FIG. 7 according to an exemplary embodiment of the present disclosure.

As shown in FIG. 9A and FIG. 9B, the vertical direction identification area 606 is an upper edge area of the geometry 60 in the vertical direction or an area near the top end or the bottom end of the inner slope 603, and is divided into an upper identification area 6061 and a lower identification area 6062. The coordinate range of the upper identification area 6061 and the lower identification area 6062 in the vertical direction is the coordinate range corresponding to the surface 602 area obtained by the projection of the upper identification area 6061 and the lower identification area 6062 in the vertical direction. As shown in FIG. 9A, a point E is a coordinate point of one vertex of the upper identification area 6061 on the Y axis, a point D is a coordinate point of one vertex of the lower identification area 6062 on the Y axis, and the surface 602 areas are divided through the coordinate system of the game scene in the vertical direction, or may be divided through the independent coordinate system corresponding to each geometry 60. The coordinate value of the virtual character 30 in the vertical direction is compared with the coordinate ranges of the upper identification area 6061 and the lower identification area 6062 to determine the current vertical direction identification area 606 where the virtual character is located.

At step S5102, a horizontal plane 602 of the at least one first building area 40 is determined according to the type of the vertical direction identification area 606.

Specifically, in each geometry 60, the vertical direction identification area 606 is associated with the horizontal plane, and the vertical direction identification area where a virtual character is located is to determine the horizontal plane where the virtual character is located. In the present embodiment, the upper identification area 6061 is associated with the horizontal plane of the upper layer of the geometry 60, i.e., the upper surface 602 of the geometry 60, and the lower identification area 6062 is associated with the horizontal plane of the bottom layer of the geometry 60, i.e., the lower surface 602 of the geometry 60. For example, as shown in FIG. 9, when the virtual character 30 is in the upper identification area 6061, it is determined that the upper surface 602 is a horizontal plane for determining the first building area 40.

At step S5103, a horizontal direction identification area 605 where the virtual character 30 is currently located is determined according to the current position information 301 in the horizontal plane. The content of this step is similar to that in the above embodiment, and the descriptions thereof are omitted herein.

Through the above implementation manner, the vertical direction identification area 606 is associated with the horizontal direction identification area 605. When the virtual character 30 is displaced in the vertical direction while moving, the horizontal direction identification area 605 where the virtual character is currently located is determined by determining the corresponding vertical direction identification area 606 where the virtual character is currently located, and the horizontal direction identification area 605 is used as a criterion for determining the first building area 40. In this way, the building 2011 built by the virtual character 30 and the original building in the game scene can be effectively aligned and interconnected. In addition, physical collision detection between the buildings 2011 in the game scene is avoided, so that the system overhead can be effectively reduced, and the smooth running of the game can be improved.

In step S520, it is determined whether the moving direction information of the virtual character 30 matches the preset direction information corresponding to the determined horizontal direction identification area 605.

Figure 10:
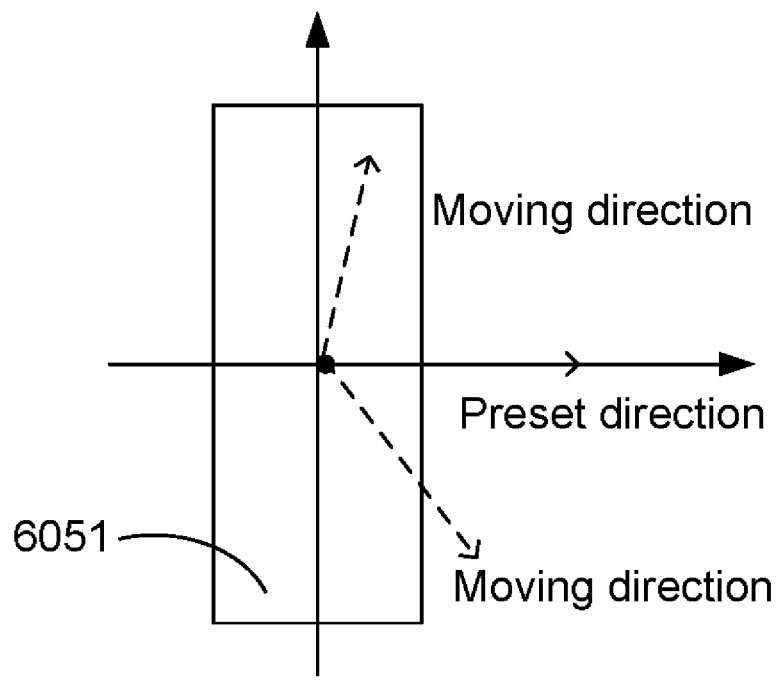
FIG. 10 is a schematic diagram of a unidirectional identification area of the first geometry shown in FIG. 8 according to an exemplary embodiment of the present disclosure.

Specifically, as shown in FIG. 10, the moving direction information of the virtual character 30 is acquired. When an angle between the moving direction information and the preset direction information corresponding to the unidirectional identification area 6051 of the current horizontal direction identification area 605 is less than 90 degrees, it is determined that the moving direction information of the virtual character 30 matches the preset direction information corresponding to the determined horizontal direction identification area 605. When the moving direction information is located in the preset direction information corresponding to the multi-directional identification area 6052 of the current horizontal direction identification area 605, it is determined that a threshold is satisfied. In the present embodiment, the multi-directional identification area 6052 includes information of two directions. When the angle between the moving direction information and information of the two directions is less than 90 degrees, it is determined that the moving direction information of the virtual character 30 matches the preset direction information corresponding to the determined horizontal direction identification area 605.

Through the above implementation manner, when detecting that the virtual character 30 moves toward a preset direction of the unidirectional identification area 6051, that is, the operation of building the building 2011 is directly triggered, the effect of automatic building following the movement of the virtual character 30 is achieved. Moreover, the operation of building is triggered by setting a threshold, so that the fault tolerance effect is achieved, and the phenomenon of building due to improper operation of the user is avoided.

In other embodiments, at step S520, it is determined whether the time period in which the virtual character 30 is located in the current horizontal direction identification area 605 satisfies a preset threshold.

At step S530, if the moving direction information satisfies the preset threshold, the building 2011 corresponding to the model 201 to be built is built in at least one first building area 40 adjacent to the current horizontal direction identification area 605.

In the present embodiment, the game scene is formed by splicing the surfaces 602 of the geometries 60 adjacent to each other, and the unidirectional identification area 6051 is included at the edge of each horizontal direction identification area 605. Therefore, the unidirectional identification area 6051 of each geometry 60 is adjacent to other geometries 60. When it is determined that the moving direction information of the virtual character 30 matches the preset direction information of the unidirectional identification area 6051, it is determined that the second geometry 604 adjacent to the unidirectional identification area 6051 is the first building area 40, and the building 2011 corresponding to the model 201 to be built is built in the first building area 40. In other implementation manners, the second geometry 604 may also be one of the geometries 60, constituting the first building area 40, adjacent to the unidirectional identification area 6051 of the horizontal direction identification area 605 where the virtual character 30 is located. As shown in FIG. 6, when it is determined that the moving direction information of the virtual character 30 matches the preset direction information of a multi-directional identification area 6052, three geometries 604 adjacent to the multi-directional identification area 6052 are determined as the first building area 40. For example, when the virtual character 30 is in the first geometry 601 and the moving direction information matches east and north direction information preset in the multi-directional identification area 6052, it is determined that the second geometry 604 adjacent to the east direction of the first geometric body 601 and the third geometry 60 adjacent to the north direction are the first building area 40, and the building 2011 corresponding to the model 201 to be built is built in the first building area 40.

It is to be noted that the first building area 40 may be the surface 602 or the inner slope 603 of the geometry 60 adjacent to the current geometry 60 where the virtual character is located. The surface 602 or the inner slope 603 that is adapted to the model 201 to be built is automatically selected by the system as the first building area according to the type of the model 201 to be built. For example, if the model 201 to be built is a horizontal wall, when the virtual character 30 is located in the first unidirectional identification area 6051 of the horizontal direction identification area 605 of the first geometry 601, the preset direction of the first unidirectional identification area 6051 is "east", and when it is detected that the moving direction information of the virtual character 30 is also "east", it is determined that the horizontal plane of the second geometry 604 horizontally adjacent to the east direction of the first geometry 601 is the first building area 40. If the model 201 to be built is a vertical wall, when the virtual character 30 is located in the first unidirectional identification area 6051 of the horizontal direction identification area 605 of the first geometry 601, the preset direction of the first unidirectional identification area 6051 is "east", and when it is detected that the moving direction information of the virtual character 30 is also "east", it is determined that the horizontal plane of the second geometry 604 vertically adjacent to the east direction of the first geometry 601 is the first building area 40.

In other embodiments, the step S1303 of building, when determining that the at least one of the current position information 301 and the moving state information 302 satisfies the preset condition, the building 2011 corresponding to the model 201 to be built in the first building area 40 specifically includes the following steps.

At step S610, a current vertical direction identification area 606 where the virtual character 30 is located is determined according to the current position information 301 of the virtual character 30.

The specific manner is similar to the content of step S510 in the above embodiment, except that not only the upper identification area 6061 and the lower identification area 6062 are configured to determine the horizontal plane of the first building area, but also the upper identification area 6061 is configured to trigger the building of the building 2011 corresponding to the model to be built above the geometry 60 where the virtual character 30 is located and the lower identification area 6062 is configured to trigger the building of the building 2011 corresponding to the model to be built below the geometry 60 where the virtual character 30 is located. In each geometry 60, the upper identification area 6061 or the lower identification area 6062 is located adjacent to the top or bottom horizontal plane of the internal slope 603 of the geometry 60.

At step S620, it is determined whether the moving direction information of the virtual character 30 matches the preset direction information corresponding to the vertical direction identification area 606.

Specifically, component information of the moving direction information of the virtual character 30 in the vertical direction, that is, a component vector of a direction vector of the moving direction information of the virtual character 30 in the vertical direction is acquired. When an angle between the component vector and the preset direction information corresponding to the upper identification area 6061 or the lower identification area 6062 of the preset direction information corresponding to the current vertical direction identification area 606 is less than 90 degrees, it is determined that the threshold is satisfied.

At step S630, when determining that the moving state information of the virtual character matches preset direction information corresponding to the determined vertical direction identification area, the building 2011 corresponding to the model 201 to be built is built in a preset direction corresponding to the current vertical direction identification area 606 in at least one first building area 40 adjacent to the geometry including the current vertical direction identification area 606.

It is to be noted that the vertical direction identification area 606 is used for controlling the building of the building 2011 corresponding to the model 201 to be built in the preset direction of the upper identification area 6061 or the lower identification area 6062. For example, the preset direction of the upper identification area 6061 is "up". When the moving direction information of the virtual character 30 is "up", the building of the building 2011 corresponding to the model 201 to be built above the geometry 60 where the virtual character 30 is currently located is controlled.

Further, before controlling the building of the building 2011 corresponding to the model 201 to be built in the preset direction of the upper identification area 6061 or the lower identification area 6062, it is also necessary to determine the type of the model 201 to be built. When a preset type is satisfied, a building direction in the vertical direction is acquired according to the upper identification area 6061 or the lower identification area 6062.

For example, the model 201 to be built is a ladder, and the ladder includes a slope 603 for the movement of the virtual character, and the slope 603 is formed by splicing the internal slopes 603 of a part of geometries 60 constituting the ladder. When the virtual character 30 moves upward along the slope 603, the virtual character may pass through the upper identification area 6061 located at the top of the slope 603. When it is detected that a vertical vector of a direction vector of the upward movement of the virtual character 30 matches the preset "up" direction of the upper identification area 6061, and the type of the model 201 to be built is the ladder, the ladder is controlled to be built upward.

It is to be noted that the vertical direction identification area 606 is configured to determine the building direction in the vertical direction, and the horizontal direction identification area 605 is configured to determine the specific building direction on the horizontal plane. For example, in the above illustration, after determining that the ladder is built upward, it is necessary to determine the building direction on the horizontal plane by the horizontal direction identification area 605. Meanwhile, although the building direction of the vertical direction is first determined by the vertical direction identification area in the present implementation manner and then the building direction of the horizontal plane is determined by the horizontal direction identification area, in other embodiments, the sequence of steps in the two aspects may be reversed. That is, the building direction on the horizontal plane is first determined by the horizontal direction identification area and then the building direction of the vertical direction is determined by the vertical direction identification area. Of course, the steps in the two aspects may also be performed simultaneously. There is no specific limitation herein.

In other embodiments, the building trigger area is also configured to trigger the determination of the first building area 40. Therefore, the manner of determining the first building area 40 in the game scene according to the at least one of the current position information 301 and the moving state information 302 includes: at least one geometry 60 is selected from multiple interconnected virtual geometries 60 as the first building area 40 according to at least one of the position information 301 and the moving state information 302. The determination of the first building area 40 may also be achieved by the following manners.

At step S710, current coordinate value information of the virtual character 30 is acquired.

At step S720, a building trigger area where the virtual character 30 is located is determined according to the current coordinate value information of the virtual character 30. The building trigger area is a direction identification area configured with preset direction information. The direction identification area includes a horizontal direction identification area 605 and a vertical direction identification area 606.

At step 730, a first building area 40 adjacent to the first geometry 601 including the building trigger area is determined according to the building trigger area. Specifically, the first building area 40 adjacent to the first geometry 601 including the building trigger area is determined according to preset direction information in the building trigger area where the virtual character 30 is located. For example, when the virtual character 30 is in the building trigger area of the upper surface 602 of the first geometry 601, specifically, the unidirectional identification area 6051 in the building trigger area, the preset direction information in the unidirectional identification area 6051 is "east", the second geometry 604 adjacent to the "east" direction of the first geometry 601 is determined to be the first building area 40.

Through the above implementation manner, the first building area is determined according to the building trigger area where the virtual character 30 is located, and when the moving direction information of the virtual character 30 matches the preset direction information in the building trigger area, the building of the building 2011 corresponding to the model 201 to be built is triggered, thereby reducing the data information to be acquired and the number of comparisons, and reducing the memory space occupation.

Figure 11:
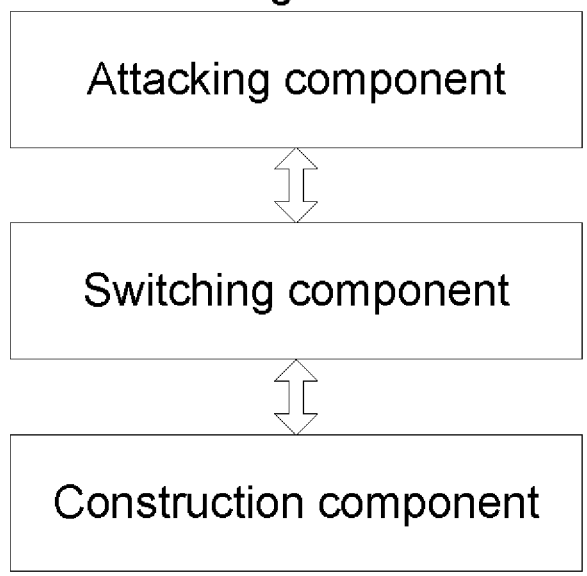
FIG. 11 is a structural block diagram of an information processing apparatus according to an embodiment of the present disclosure.

As shown in FIG. 11, an exemplary embodiment also discloses an information processing apparatus. The apparatus is applied to a mobile terminal having at least one processor for executing a software application and a touch screen which is rendered with a GUI. Contents at least partially including a game scene are displayed. The game scene includes at least one virtual character. FIG. 11 is a composition diagram of an information processing apparatus according to an embodiment of the present disclosure. As shown in FIG. 11, the apparatus includes: a response element, a control element and a determination element.

The response element is configured to control, in response to a trigger event for starting a continuous building mode, the at least one virtual character to enter the continuous building mode.

The control element is configured to provide at least one model selection control on the GUI, and each of the at least one model selection control corresponds to different models to be built, and the at least one model selection control is configured to receive a first touch operation and determine a model to be built corresponding to the first touch operation.

The determination element is configured to build, when determining that the at least one virtual character satisfies a preset condition, a building corresponding to the model to be built in at least one first building area in the game scene.

Specific details of various component elements in the above embodiment have been described in detail in the corresponding information processing method. In addition, it can be understood that the information processing apparatus further includes other element components corresponding to those in the information processing method. Therefore, detail descriptions are omitted herein.

It is to be noted that although several components or elements of the device for action execution are mentioned in the above detailed description, such division is not mandatory. In fact, according to the implementation manners of the present disclosure, the features and functions of two or more components or elements described above may be embodied in one component or element. Conversely, the features and functions of one component or element described above may be further divided into multiple components or elements and embodied.

Figure 12:
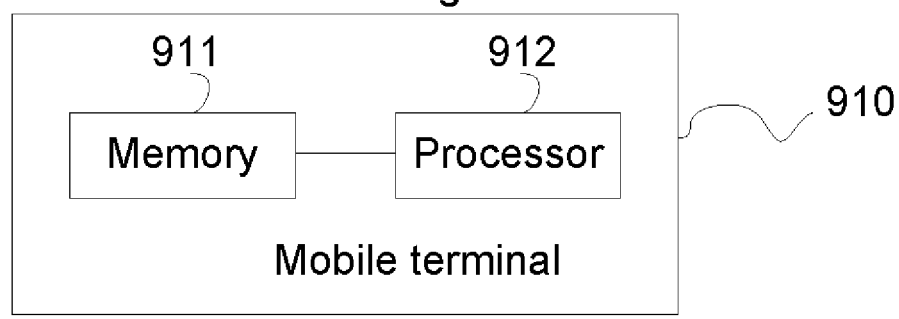
FIG. 12 is a structural block diagram of a mobile terminal according to an embodiment of the present disclosure.

FIG. 12 is a structural block diagram of a mobile terminal according to an embodiment of the present disclosure. A terminal 910 of the present embodiment includes: a memory 911 and a processor 912. The memory 911 and the processor 912 may be connected by a bus. A software application is executed on the processor of the terminal, and a touch screen of the terminal is rendered with a GUI.

The processor 912 is provided.

The memory 911 is configured to store at least one executable instruction of the processor.

The processor is configured to execute the at least one executable instruction to implement the following steps:
in response to a trigger event for starting a continuous building mode, controlling the at least one virtual character to enter the continuous building mode;
providing at least one model selection control on the GUI, and each of the at least one model selection control corresponds to different models to be built, and the at least one model selection control is configured to receive a first touch operation and determine a model to be built corresponding to the first touch operation; and
when determining that the at least one virtual character satisfies a preset condition, building a building corresponding to the model to be built in at least one first building area in the game scene.

In an optional embodiment, before, in response to the trigger event for starting the continuous building mode, controlling the at least one virtual character to enter the continuous building mode the method further includes:
providing a trigger control for starting the continuous building mode on the GUI, the trigger control being configured to control the at least one virtual character to enter the continuous building mode in response to a touch operation.

In an optional embodiment, when determining that the virtual character satisfies the preset condition, building the building corresponding to the model to be built in the at least one first building area includes:
acquiring current position information and moving state information of the at least one virtual character; and
when determining that at least one of the current position information and the moving state information satisfies the preset condition, building the building corresponding to the model to be built in the at least one first building area.

In an optional embodiment, before building the building corresponding to the model to be built in the at least one first building area, the method further includes:
according to the at least one of the current position information and the moving state information, determining the at least one first building area.

In an optional embodiment, a space of the game scene is divided into multiple interconnected virtual geometries.

In an optional embodiment, determining the at least one first building area according to the at least one of the current position information and the moving state information includes:
according to the at least one of the current position information and the moving state information, selecting at least one geometry from the multiple interconnected virtual geometries as the at least one first building area.

In an optional embodiment, each of the multiple interconnected virtual geometries is configured with a direction identification area, the direction identification area comprising: a horizontal direction identification area and a vertical direction identification area.

In an optional embodiment, the horizontal direction identification area comprises multiple unidirectional identification areas and at least one multi-directional identification area, the multiple unidirectional identification areas being located at multiple edge areas in different directions on a horizontal direction of each geometry respectively, and the at least one multi-directional identification area being an overlapping area between the multiple unidirectional identification areas; and the vertical direction identification area comprises an upper identification area and a lower identification area, the upper identification area being located in an upper edge area in a vertical direction of each geometry, and the lower identification area being located in a lower edge area in the vertical direction of each geometry.

In an optional embodiment, when determining that the at least one of the current position information and the moving state information satisfies the preset condition, building the building corresponding to the model to be built in the at least one first building area includes:
determining a horizontal direction identification area where the virtual character is currently located according to the current position information; and
when determining that the moving state information of the virtual character matches preset direction information corresponding to the determined horizontal direction identification area, building the building corresponding to the model to be built in at least one first building area adjacent to the determined horizontal direction identification area.

In an optional embodiment, determining the horizontal direction identification area where the virtual character is currently located according to the current position information includes:
  determining a vertical direction identification area where the virtual character is currently located according to the current position information;
  determining a horizontal plane of the at least one first building area according to a type of the determined vertical direction identification area; and
  in the horizontal plane, determining the horizontal direction identification area where the virtual character is currently located according to the current position information.

Through a mobile terminal provided by one embodiment of the present disclosure, when a user controls a virtual character to build a building corresponding to a model to be built, the number of interactions with a user interface can be reduced, and the building of the building corresponding to the model to be built is automatically completed by determining the situation in a game scene, so that the user completes interaction operations in a very short time, thereby improving the user experience.

Figure 13:
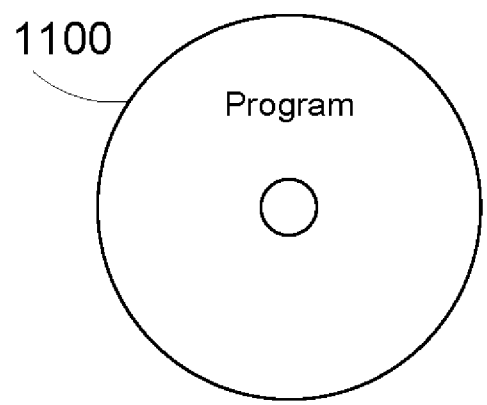
FIG. 13 is a structural schematic diagram of a storage medium according to an embodiment of the present disclosure.

FIG. 13 is a structural schematic diagram of a storage medium according to an embodiment of the present disclosure. As shown in FIG. 13, a program product 1100 according to an implementation manner of the present disclosure is described. A computer program is stored thereon. When being executed by a processor, the computer program implements the following steps:
  in response to a trigger event for starting a continuous building mode, controlling the at least one virtual character to enter the continuous building mode;
  providing at least one model selection control on the GUI, and each of the at least one model selection control corresponds to different models to be built, and the at least one model selection control is configured to receive a first touch operation and determine a model to be built corresponding to the first touch operation; and
  when determining that the at least one virtual character satisfies a preset condition, building a building corresponding to the model to be built in at least one first building area in the game scene.

In an optional embodiment, before, in response to the trigger event for starting the continuous building mode, controlling the at least one virtual character to enter the continuous building mode the method further includes:
  providing a trigger control for starting the continuous building mode on the GUI, the trigger control being configured to control the at least one virtual character to enter the continuous building mode in response to a touch operation.

In an optional embodiment, when determining that the virtual character satisfies the preset condition, building the building corresponding to the model to be built in the at least one first building area includes:
  acquiring current position information and moving state information of the at least one virtual character; and
  when determining that at least one of the current position information and the moving state information satisfies the preset condition, building the building corresponding to the model to be built in the at least one first building area.

In an optional embodiment, before building the building corresponding to the model to be built in the at least one first building area, the method further includes:
  according to the at least one of the current position information and the moving state information, determining the at least one first building area.

In an optional embodiment, a space of the game scene is divided into multiple interconnected virtual geometries.

In an optional embodiment, determining the at least one first building area according to the at least one of the current position information and the moving state information includes:
  according to the at least one of the current position information and the moving state information, selecting at least one geometry from the multiple interconnected virtual geometries as the at least one first building area.

In an optional embodiment, each of the multiple interconnected virtual geometries is configured with a direction identification area, the direction identification area comprising: a horizontal direction identification area and a vertical direction identification area.

In an optional embodiment, the horizontal direction identification area comprises multiple unidirectional identification areas and at least one multi-directional identification area, the multiple unidirectional identification areas being located at multiple edge areas in different directions on a horizontal direction of each geometry respectively, and the at least one multi-directional identification area being an overlapping area between the multiple unidirectional identification areas; and the vertical direction identification area comprises an upper identification area and a lower identification area, the upper identification area being located in an upper edge area in a vertical direction of each geometry, and the lower identification area being located in a lower edge area in the vertical direction of each geometry.

In an optional embodiment, when determining that the at least one of the current position information and the moving state information satisfies the preset condition, building the building corresponding to the model to be built in the at least one first building area includes:
  determining a horizontal direction identification area where the virtual character is currently located according to the current position information; and
  when determining that the moving state information of the virtual character matches preset direction information corresponding to the determined horizontal direction identification area, building the building corresponding to the model to be built in at least one first building area adjacent to the determined horizontal direction identification area.

In an optional embodiment, determining the horizontal direction identification area where the virtual character is currently located according to the current position information includes:
  determining a vertical direction identification area where the virtual character is currently located according to the current position information;
  determining a horizontal plane of the at least one first building area according to a type of the determined vertical direction identification area; and
  in the horizontal plane, determining the horizontal direction identification area where the virtual character is currently located according to the current position information.

Through a mobile terminal provided by one embodiment of the present disclosure, when a user controls a virtual character to build a building corresponding to a model to be built, the number of interactions with a user interface can be reduced, and the building of the building corresponding to the model to be built is automatically completed by determining the situation in a game scene, so that the user completes interaction operations in a very short time, thereby improving the user experience.

The computer-readable storage medium may include a data signal that is propagated in a baseband or as part of a carrier, carrying readable program code. Such propagated data signals may take a variety of forms including, but not limited to, electromagnetic signals, optical signals, or any suitable combination of the foregoing. The computer-readable storage medium may send, propagate, or transmit a program for use by or in connection with an instruction execution system, apparatus, or device.

Program codes included in the computer-readable storage medium may be transmitted by any suitable medium, including but not limited to wireless, wire, optical cable, radio frequency, etc., or any suitable combination of the foregoing.

In an exemplary embodiment of the present disclosure, an electronic device is also provided. The electronic device may implement functions of a terminal, and the electronic device includes: a processing component and a display apparatus, which may further include at least one processor, and a memory resource represented by a memory and configured to store at least one instruction executable by the processing component, such as an application program. The application program stored in the memory may include at least one component each corresponding to a set of instructions. In addition, the processing component is configured to execute instructions to perform the above-described information processing method.

The electronic device may also include: a power supply component, configured to perform power management on the electronic device; a wired or wireless network interface, configured to connect the electronic device to a network; and an input output (I/O) interface. The electronic device may operate based on an operating system stored in the memory, such as Android, iOS, Windows, Mac OS X, Unix, Linux, FreeBSD, or the like.

Through the description of the above implementation manner, those skilled in the art will readily understand that the example implementation manners described herein may be implemented by software or by software in combination with necessary hardware. Therefore, the technical solution according to the embodiment of the present disclosure may be embodied in the form of a software product, which may be stored in a non-volatile storage medium (which may be a CD-ROM, a USB flash drive, a mobile hard disk, etc.) or on a network. A number of instructions are included to cause a computing device (which may be a personal computer, server, electronic device, or network device, etc.) to perform a method in accordance with an embodiment of the present disclosure.

Other embodiments of the present disclosure will be apparent to those skilled in the art after considering the specification and practicing the present disclosure herein. The present disclosure is intended to cover any variations, uses, or adaptations of the present disclosure, which are in accordance with the general principles of the present disclosure and include common general knowledge or conventional technical means in the art that are not disclosed in the present disclosure. The specification and examples are to be regarded as illustrative, and the true scope and spirit of the present disclosure are pointed out by the claims.

It is to be understood that the present disclosure is not limited to the accurate structure that have been described and shown in the drawings, and may make various modifications and variations without departing the scope thereof. The scope of the present disclosure is limited by the appended claims.

What is claimed is:

1. An information processing method, applied to a terminal device having at least one processor for executing a software application and a screen which is rendered with a graphical user interface (GUI) displaying contents at least partially comprising a game scene comprising at least one virtual character, the method comprising:
providing at least one model selection control on the GUI, wherein each of the at least one model selection control corresponds to different models to be built, and the at least one model selection control is configured to receive a first touch operation and determine a model to be built corresponding to the first touch operation; and
wherein when a game program run by the terminal device determines that the at least one virtual character satisfies a preset condition, automatically building a building corresponding to the model to be built in at least one first building area in the game scene;
wherein the preset condition comprises at least one of the followings: time, position, moving speed, moving direction, orientation of the at least one virtual character.

2. The information processing method as claimed in claim 1, wherein when determining that the virtual character satisfies the preset condition, building the building corresponding to the model to be built in the at least one first building area comprises:
acquiring current position information and moving state information of the at least one virtual character; and
when determining that at least one of the current position information and the moving state information satisfies the preset condition, building the building corresponding to the model to be built in the at least one first building area.

3. The information processing method as claimed in claim 2, further comprising:
according to the at least one of the current position information and the moving state information, determining the at least one first building area.

4. The information processing method as claimed in claim 3, wherein a space of the game scene is divided into a plurality of interconnected virtual geometries.

5. The information processing method as claimed in claim 4, wherein determining the at least one first building area according to the at least one of the current position information and the moving state information comprises:
according to the at least one of the current position information and the moving state information, selecting at least one geometry from the plurality of interconnected virtual geometries as the at least one first building area.

6. The information processing method as claimed in claim 4, wherein each of the plurality of interconnected virtual geometries is configured with a direction identification area, the direction identification area comprising: a horizontal direction identification area and a vertical direction identification area.

7. The information processing method as claimed in claim 6, wherein the horizontal direction identification area comprises a plurality of unidirectional identification areas and at least one multi-directional identification area, the plurality of unidirectional identification areas being located at a plurality of edge areas in different directions on a horizontal direction of each geometry respectively, and the at least one multi-directional identification area being an overlapping area between the plurality of unidirectional identification areas; and the vertical direction identification area comprises an upper identification area and a lower identification area, the upper identification area being located in an upper edge area in a vertical direction of each geometry, and the lower identification area being located in a lower edge area in the vertical direction of each geometry.

8. The information processing method as claimed in claim 7, wherein when determining that the at least one of the current position information and the moving state information satisfies the preset condition, building the building corresponding to the model to be built in the at least one first building area comprises:
    determining a horizontal direction identification area where the virtual character is currently located, according to the current position information; and
    when determining that the moving state information of the virtual character matches preset direction information corresponding to the determined horizontal direction identification area, building the building corresponding to the model to be built in at least one first building area adjacent to the determined horizontal direction identification area.

9. The information processing method as claimed in claim 8, wherein determining the horizontal direction identification area where the virtual character is currently located according to the current position information comprises:
    determining a vertical direction identification area where the virtual character is currently located, according to the current position information;
    determining a horizontal plane of the at least one first building area, according to a type of the determined vertical direction identification area; and
    in the horizontal plane, determining the horizontal direction identification area where the virtual character is currently located, according to the current position information.

10. The information processing method as claimed in claim 8, wherein the first building area is one of the following area:
    when determining that the moving direction information of the virtual character matches the preset direction information of the unidirectional identification area, the first building area is a second geometry adjacent to the unidirectional identification area;
    when determining that the moving direction information of the virtual character matches the preset direction information of a multi-directional identification area, the first building area is more than one geometry adjacent to the multi-directional identification area.

11. The information processing method as claimed in claim 5, wherein the first building area is one of the followings:
    a surface of a geometry adjacent to a current geometry determined according to the at least one of the current position information and the moving state information;
    an inner slope of a geometry adjacent to the current geometry determined according to the at least one of the current position information and the moving state information.

12. The information processing method as claimed in claim 7, wherein when determining that the at least one of the current position information and the moving state information satisfies the preset condition, building the building corresponding to the model to be built in the at least one first building area comprises:
    determining a current vertical direction identification area where the virtual character is currently located, according to the current position information;
    when determining that the moving state information of the virtual character matches preset direction information corresponding to the determined vertical direction identification area, building the building corresponding to the model to be built in at least one first building area adjacent to a geometry including the current vertical direction identification area.

13. The information processing method as claimed in claim 1, wherein a plurality of model selection controls are arranged in a mode selection control area with a preset shape according to a first preset condition, wherein the first preset condition is that circumferential arrangement is performed by taking a preset point as a circle center.

14. The information processing method as claimed in claim 10, the mode selection control area is automatically adjusted by means of machine learning, or the mode selection control area is determined in a user-defined manner.

15. An information processing apparatus, applied to a terminal device having at least one processor for executing a software application and a screen which is rendered with a GUI, displaying contents at least partially comprising a game scene, the game scene comprising at least one virtual character, the apparatus comprising:
    a control element, configured to provide at least one model selection control on the GUI, wherein each of the at least one model selection control corresponds to different models to be built, and the at least one model selection control is configured to receive a first touch operation and determine a model to be built corresponding to the first touch operation; and
    a determination element, configured to automatically build, when a game program run by the terminal device determines that the at least one virtual character satisfies a preset condition, a building corresponding to the model to be built in at least one first building area in the game scene;
    wherein the preset condition comprises at least one of the followings: time, position, moving speed, moving direction, orientation of the at least one virtual character.

16. A mobile terminal executing an information processing method, comprising:
    a processor; and
    a memory, configured to store at least one executable instruction of the processor,
    wherein the processor is configured to perform the information processing method of:
    providing at least one model selection control on the GUI, wherein each of the at least one model selection control corresponds to different models to be built, and the at least one model selection control is configured to receive a first touch operation and determine a model to be built corresponding to the first touch operation; and
    wherein when a game program run by the terminal device determines that the at least one virtual character satisfies a preset condition, automatically building a building corresponding to the model to be built in at least one first building area in the game scene;
    wherein the preset condition comprises at least one of the followings: time, position, moving speed, moving direction, orientation of the at least one virtual character.

17. A non-transitory storage medium applied to an information processing method, a computer program being executed by a processor to implement the information processing method of:

provinding at least one model selection control on the GUI, wherein each of the at least one model selection control corresponds to different models to be built, and the at least one model selection control is configured to receive a first touch operation and determine a model to be built corresponding to the first touch operation; and wherein when a game program run by the terminal device determines that the at least one virtual character satisfies a preset condition, automatically building a building corresponding to the model to be built in at least one first building area in the game scene;

wherein the preset condition comprises at least one of the followings: time, position, moving speed, moving direction, orientation of the at least one virtual character.

* * * * *